(12) United States Patent
Bigelow

(10) Patent No.: US 8,366,051 B2
(45) Date of Patent: Feb. 5, 2013

(54) AIR BARRIER FOR USE WITH AN EXPANDABLE STRUCTURE

(75) Inventor: Robert T. Bigelow, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 596 days.

(21) Appl. No.: 11/723,237

(22) Filed: Mar. 19, 2007

(65) Prior Publication Data

US 2008/0230655 A1 Sep. 25, 2008

(51) Int. Cl.
*B64G 1/00* (2006.01)

(52) U.S. Cl. ............. 244/158.3; 244/159.4; 244/159.5; 52/2.13; 52/2.14; 52/2.19; 52/2.22

(58) Field of Classification Search .......... 244/158.1, 244/158.3, 159.4, 159.5, 171.7, 125, 126, 244/128; 52/2.13, 2.14, 2.19, 2.22
See application file for complete search history.

(56) References Cited

U.S. PATENT DOCUMENTS

| | | | | |
|---|---|---|---|---|
| 1,451,667 A | * | 4/1923 | Upson | 244/125 |
| 3,144,219 A | * | 8/1964 | Schnitzer | 244/158.3 |
| 3,210,026 A | * | 10/1965 | Frisch | 244/159.4 |
| 3,348,352 A | * | 10/1967 | Cummings | 52/646 |
| 5,429,851 A | * | 7/1995 | Sallee | 428/71 |
| 6,231,010 B1 | * | 5/2001 | Schneider et al. | 244/158.3 |
| 6,439,508 B1 | * | 8/2002 | Taylor | 244/158.3 |
| 6,547,189 B1 | * | 4/2003 | Raboin et al. | 244/158.3 |
| 6,899,301 B2 | * | 5/2005 | Bigelow | 244/159.4 |
| 6,962,310 B1 | * | 11/2005 | Bigelow | 244/158.1 |
| 2005/0061918 A1 | * | 3/2005 | Bigelow | 244/159 |

\* cited by examiner

*Primary Examiner* — Philip J Bonzell

(74) *Attorney, Agent, or Firm* — Franklin E. Gibbs

(57) ABSTRACT

An air barrier having a scuff coating is used in connection with the core of a spacecraft to form an inflatable, or expandable, human habitat module. The air barrier is comprised of a number of segments joined together to form a enclosure that has at least one opening. The joined segments are generally gas impermeable, flexible, and have a scuff coating on both sides of the segments.

9 Claims, 3 Drawing Sheets

AIR BARRIER FOR USE WITH AN EXPANDABLE STRUCTURE

BACKGROUND OF THE INVENTION

1. Field of the Invention

The present invention relates to an air barrier and in particular an air barrier that is used in connection with an expandable, or inflatable, structure suited for space applications or use on extraterrestrial masses.

2. Description of Related Art

Inflatable, or expandable, spacecraft are known generally in the art as evidenced by U.S. Pat. No. 6,231,010 to Schneider, et al and U.S. Pat. No. 6,547,189 to Raboin, et al. These types of habitable structures have the unique ability to change states from a compressed launch state to an inflated deployed state. In the deployed state, the structure provides an internal volume that is many times greater than the volume found in the launch state.

During deployment of the spacecraft an atmosphere suitable to support humans is injected into the structure, or module, to facilitate inflation. When completely inflated environmental systems within the module re-circulates the internal atmosphere to filter out harmful chemicals and recycle carbon dioxide into breathable oxygen. The structure primarily responsible for this operation is the air barrier.

A module's success is therefore heavily dependent upon the reliable operation of an air barrier to retain the environment within the module. However, construction techniques may impart latent defects that could jeopardize the module during operation. These flaws may occur, for example, from people walking on the air barrier during construction or sharp edged items coming into contact with the air barrier during construction on in deployment. What is needed is an air barrier that can withstand such interactions without damaging the air barrier's gas impermeable characteristic.

BRIEF SUMMARY OF THE INVENTION

An air barrier system comprised of a plurality of generally gas impermeable and substantially flexible segments having an inner and outer surface where each surface is substantially scuff resistant. The plurality of generally gas impermeable and substantially flexible segments are attached to one another to form an enclosure. The enclosure having at least one edge defining an opening and the edge being securely disposed between two seal rings. Further, at least one seal ring is securely attached to a spacecraft bulkhead.

DETAILED DESCRIPTION OF THE INVENTION

Figure 1:
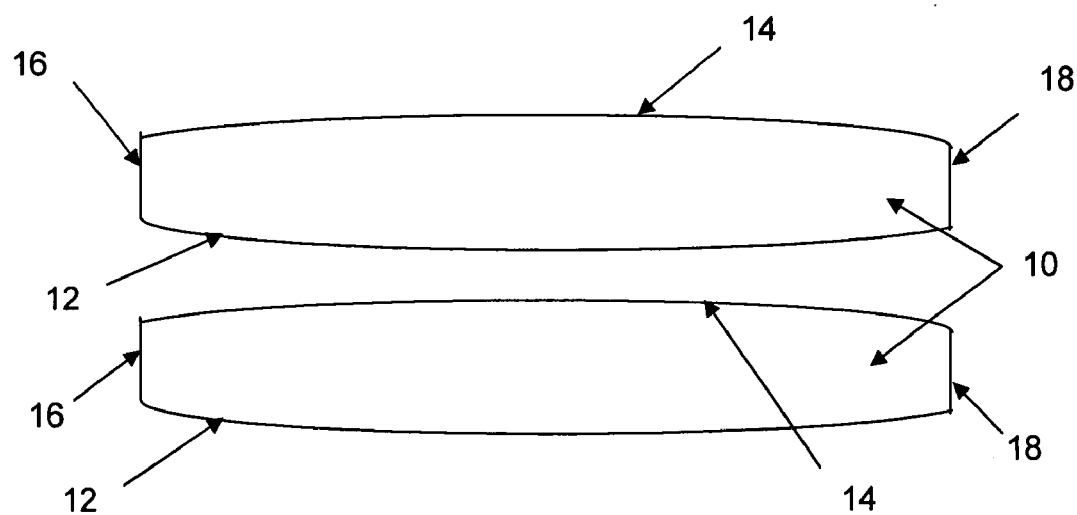
FIG. 1 is a top view of two segments.

Referring to FIG. 1, two segments 10 are identified. The segments 10 are substantially flexible and generally gas impermeable. Each segment has a first side 12 and a second side 14. The segment also has a first end 16 and a second end 18.

Figure 2:
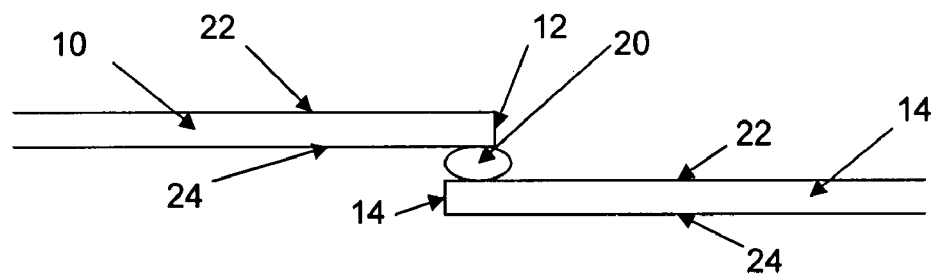
FIG. 2 is an end view of two segments being joined.

Turning to FIG. 2, two segments 10 are in position for being generally securedly attached to one another. The first side of one segment 12 is brought into the general vicinity of the second side 14 of an adjacent segment 10. FIG. 2 shows the sides overlapping. While this is the preferred embodiment, it is also possible to abut the sides together in other embodiments. In this figure, a bonding material 20 is disposed between both segments. The bonding material 20 can be glue designed to bind the segments 10 together, or a material designed to bond the segments 10 when heat is applied. Other types of bonding materials and methods, for example tape overlapping the sides, can be used and are generally know in the art.

The segments 10 have a top 22 and bottom 24 surfaces. Each surface has a scuff coat. The scuff coat adds a measure of protection to the segments 10 during construction and deployment against objects coming into contact with the segment 10 that might otherwise damage the segment. For example, the segments 10 might be exposed to foot prints and potential gouging by during the assembly of the segments into an enclosure. Scuff coating materials are known in the art and can be chosen to satisfy mission parameters and environmental requirements of a module being deployed in space or on an extraterrestrial mass. Scuff coatings can also be chosen to further reinforce the segments 10, or provide yet another layer of a generally gas impermeable surface. Scuff coatings can be an integral part of the segments or applied as a cover to the segments. Further, scuff coats can be designed to accommodate the use of a patch to seal a leak in the segment 10.

Figure 3:
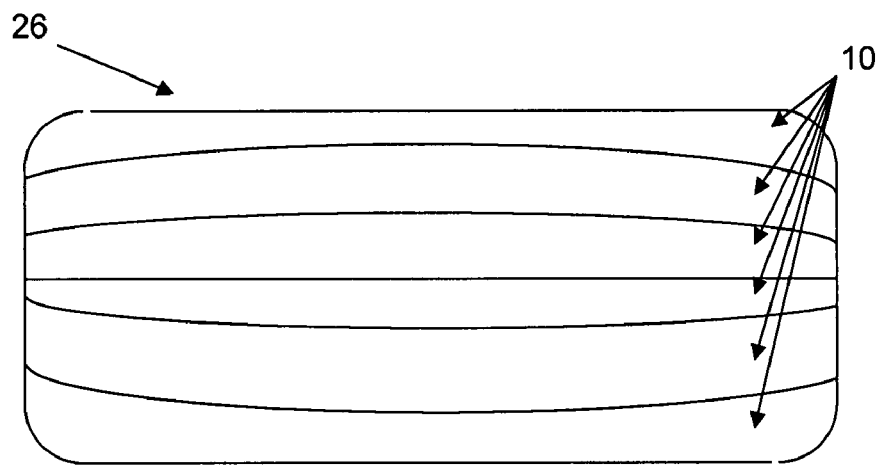
FIG. 3 is a side view of the enclosure.
Figure 4:
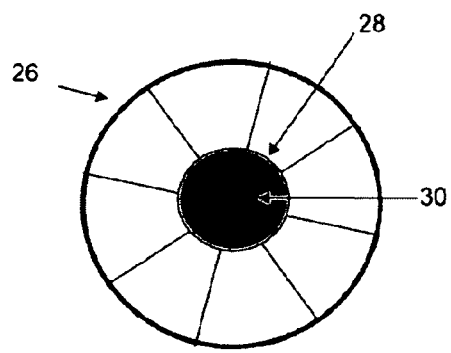
FIG. 4 is an end view of the enclosure showing an opening.

FIG. 3 illustrates a number of segments 10 bonded together to form an enclosure 26. In FIG. 4, the enclosure 26 has an opening 30 that is formed by an edge 28. In this embodiment, the edge 28 is comprised of either the first ends 16 of the segments 10 in FIG. 2 or the second ends 18 of the segments 10 in FIG. 2.

Figure 5:
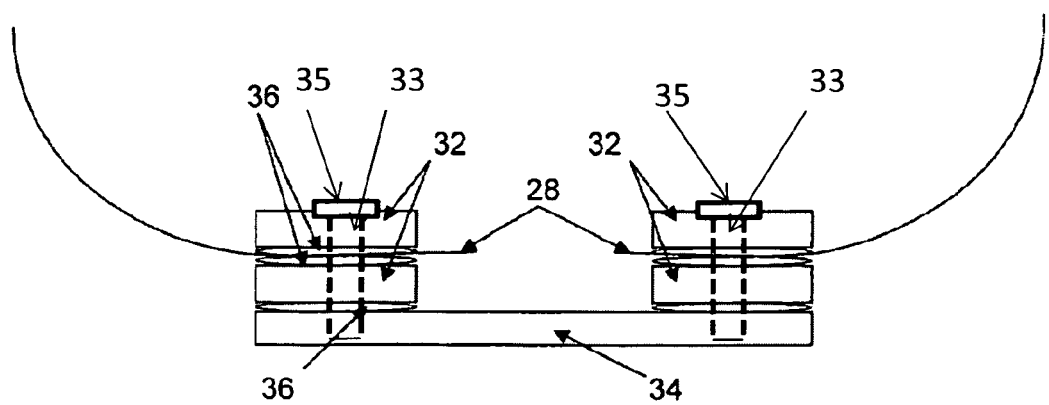
FIG. 5 is a cross sectional view of the bulkhead and enclosure.

The edge 28 is for sealing the enclosure 26 to the structure of a module. The edge 28 may be attached to a variety of structures that would form the solid core of a module. FIG. 5 is one embodiment for securing the edge 28 in the general vicinity of a bulkhead 34. The edge 28 is sandwiched between two seal rings 32. A bonding material 36 is placed on each ring 32 separating the edge 28 from the rings 32. The bonding material 36 can serve multiple functions. It can serve to secure the edge 28 to the rings 32 and to provide a generally airtight seal between the edge 28 and the rings 32. The joint structure of the edge 28, rings 32, and bonding material 36 can be affixed together by well known means. In the preferred embodiment, the structure is held together by bolts that pass through the edge 28 and bonding material 36 and terminate in the rings 32.

The combination of the edge 28, rings 32, and bonding material 36 are held in place securely to the bulkhead 34. Again, a bonding material 36 resides between the bulkhead 34 and one of the rings 32. In the preferred embodiment, the ring 32 and bulkhead 34 are held in place by a bolt that terminates in each structure. FIG. 5 illustrates one embodiment where the bolts 33 has a head 35 that terminates in ring 32 and the opposite end of the bolt terminates in the bulkhead 34.

Figure 6:
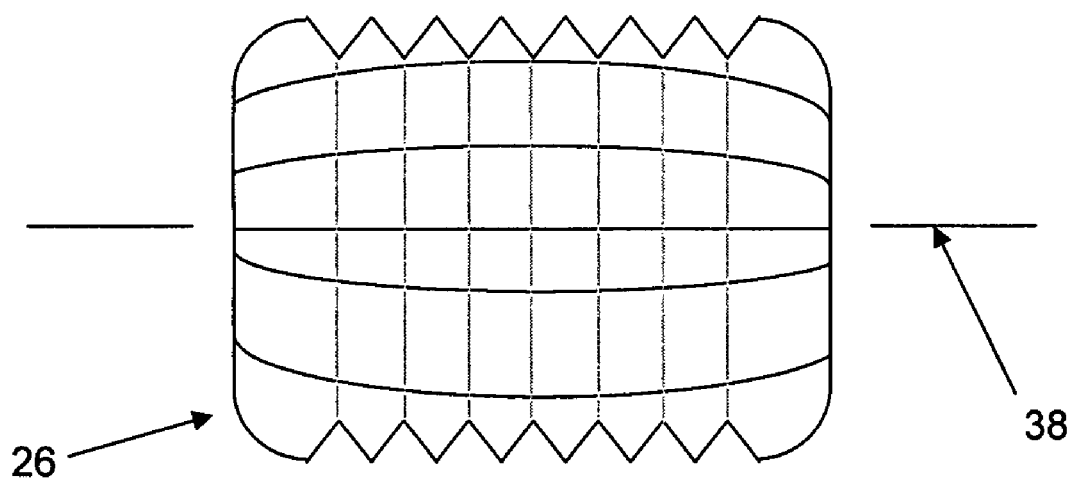
FIG. 6 is a side view of a compressed enclosure.

Turning to FIG. 6, the figure shows a longitudinal axis 38. The enclosure 26 is compressed along the axis 38. In this fashion, the enclosure 26 can accommodate modular designs that expand along the longitudinal axis 38 during deployment.

There has thus been described a novel air barrier and air barrier system. It is important to note that many configurations can be constructed from the ideas presented. The foregoing disclosure and description of the invention is illustrative and explanatory thereof and thus, nothing in the specification should be imported to limit the scope of the claims. Also, the scope of the invention is not intended to be limited to those embodiments described and includes equivalents thereto. It would be recognized by one skilled in the art the following claims would encompass a number of embodiments of the invention disclosed and claimed herein.

What is claimed is:

1. An air barrier system comprising:
    a plurality of generally gas impermeable and substantially flexible segments having an inner and outer surface where each surface is substantially scuff resistant;
    the plurality of generally gas impermeable and substantially flexible segments attached to one another thereby forming an enclosure;
    the enclosure having at least one edge defining an opening;
    the edge being securely disposed between two substantially rigid seal rings, and the edge extending through the substantially rigid seal rings; and
    at least one the seal rings being securely attached to a spacecraft bulkhead by at least two bolts with each bolt extending through at least one of the plurality of generally gas impermeable and substantially flexible segments and each bolt terminating in one of the seal rings and in the spacecraft bulkhead.

2. The air barrier of claim 1 wherein the generally gas impermeable and substantially flexible segments have a scuff coating that is adapted to sealingly receive a patch for sealing a leak in the air barrier.

3. The air barrier system of claim 1 wherein the enclosure defines a longitudinal axis and the enclosure is compressable along the longitudinal axis.

4. The air barrier system of claim 1 wherein the plurality of generally gas impermeable and substantially flexible segments are attached to one another by way of a heat sealing process.

5. The air barrier system of claim 1 wherein the plurality of generally gas impermeable and substantially flexible segments are attached to one another by way of gluing.

6. The air barrier system of claim 1 wherein the enclosure has a longitudinal axis and the enclosure is compressable along the longitudinal axis.

7. An air barrier system comprising:
    means for securing together a plurality of generally gas impermeable and substantially flexible segments having an inner and outer surface where each surface is substantially scuff resistant to form an enclosure having at least one edge defining an opening;
    means for securing the enclosure to a core of a spacecraft including a bulkhead; and
    the edge extends through two opposing substantially rigid seal rings and at least two bolts with each bolt extending through at least one of the plurality of generally gas impermeable and substantially flexible segments and each bolt terminating in one of the seal rings and the bulkhead.

8. A method for constructing an air barrier system comprising the steps of:
    securing together a plurality of generally gas impermeable and substantially flexible segments having an inner and outer surface where each surface is substantially scuff resistant to form an enclosure having at least one edge defining an opening;
    securing the enclosure to a core of a spacecraft including a bulkhead; and
    the edge extends through two opposing substantially rigid seal rings and at least two bolts with each bolt extending through at least one of the plurality of generally gas impermeable and substantially flexible segments and each bolt terminating in one of the seal rings and the bulkhead.

9. An air barrier comprising:
    a plurality of generally gas impermeable and substantially flexible segments having an inner and outer surface where each surface is substantially scuff resistant;
    the plurality of generally gas impermeable and substantially flexible segments attached to one another thereby forming an enclosure;
    the enclosure having at least one edge defining an opening; and
    the edge extends through two opposing substantially rigid seal rings and at least two bolts with each bolt extending through at least one of the plurality of generally gas impermeable and substantially flexible segments and each bolt terminating in one of the seal rings and a spacecraft bulkhead.

* * * * *